No. 734,528. PATENTED JULY 28, 1903.
G. F. FEHRING.
HARNESS ATTACHMENT.
APPLICATION FILED MAR. 1, 1902.
NO MODEL.
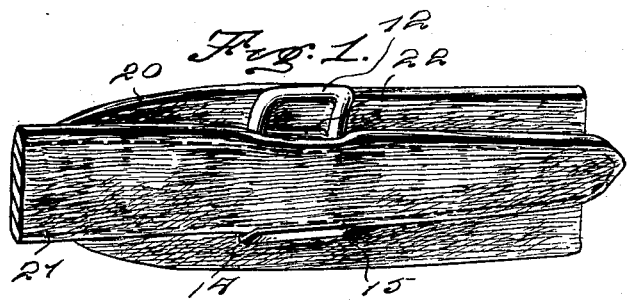
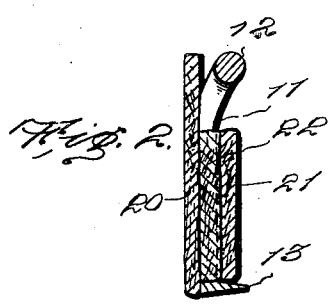
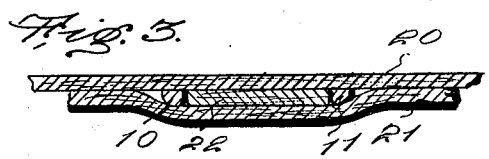
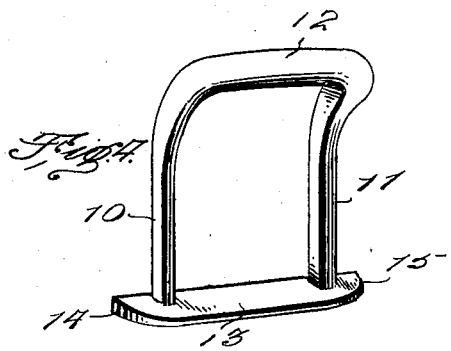
Witnesses
O. M. Simpson
S. M. McColl
G. F. Fehring Inventor
by C. A. Snow & Co.
Attorneys No. 734,528. Patented July 28, 1903.

UNITED STATES PATENT OFFICE.

GEORGE F. FEHRING, OF ANTIGO, WISCONSIN.

HARNESS ATTACHMENT.

SPECIFICATION forming part of Letters Patent No. 734,528, dated July 28, 1903.

Application filed March 1, 1902. Serial No. 96,285. (No model.)

*To all whom it may concern:*

Be it known that I, GEORGE F. FEHRING, a citizen of the United States, residing at Antigo, in the county of Langlade and State of Wisconsin, have invented a new and useful Harness Attachment, of which the following is a specification.

This invention relates to a harness attachment which may be used on any part of a harness to which it is desired to attach a strap, and it is especially adapted for use in attaching a strap at an angle to the harness member to which it is secured.

The object of the invention is to provide a metal harness attachment of a peculiar construction which is especially adapted to be applied to the breast-strap or to the breeching of a harness, but which may be used on any other harness member to which it is adapted.

Figure 1 of the accompanying drawings represents a perspective view of two leather straps having this improved device sewed between them. Fig. 2 represents a transverse vertical section thereof. Fig. 3 represents a longitudinal vertical section thereof. Fig. 4 represents a perspective view of the improved harness attachment detached.

The same reference-numerals indicate corresponding parts in all the figures.

In the drawings this improved attachment is made in the form of an approximately U-shaped loop comprising parallel arms 10 and 11, bent upwardly at their outer ends and merged into a connecting-bar 12, disposed at right angles to said arms and preferably thickened. This bar 12 forms the engaging member for the part of the harness to be connected to the loop. The inner ends of this U-shaped loop are connected by a bar 13, preferably made of a flat strip and having rounded ends 14 and 15, one edge of said bar 13 being level with the under sides of the arms and the other edge, which will be designated as the upper edge, being extended above the upper faces of the arms 10 and 11. The harness member to which this metal frame is adapted to be attached and which is here shown as the breast-strap 20 has a strap 21 secured longitudinally to the face thereof by stitching, said strap 21 being preferably narrower than the breast-strap 20 and tapering toward its ends. The U-shaped loop having its ends connected by the bar 13 is disposed transversely across the breast-strap 20, between it and the strap 21, before the stitching is effected. It is placed with its flat level lower face in contact with the breast-strap, and the strap 21 is placed over the arms 10 and 11 and lies between the upturned base 12 and the upwardly-extending flange 13' of the connecting-bar 13, with its edge adjacent thereto abutting against the inner face of said flange 13'. A filling-plug 22, preferably made of leather, is disposed intermediately between the two straps 20 and 21 and between the arms 10 and 11 and serves to hold the said straps slightly away from the arms 10 and 11 to provide for the sliding of said arms between said straps. When the straps, loop, and plug have been adjusted in the proper position, rows of stitching are formed adjacent the edges of the strap 21, passing through it and the harness member beneath it, the stitches being of sufficient length to span the arms 10 and 11 and serving to hold the parts permanently in position.

It will be observed by the construction described that unbroken rows of stitching may be formed adjacent to the upper and lower edges of the strap 21, which would be impossible if, instead of a loop, a flat metallic plate were inserted between said strap 21 and the harness member 20. This feature is of no little importance, inasmuch as a much stronger and more durable means of attachment is thereby provided. The leather plug 22 may obviously be readily pierced for the stitches, and said leather plug by filling the space between the arms 10 and 11 of the attachment prevents the strap 21 from sagging into the said space. This leather plug may be made to perform an additional function, in that it may be made to extend below the lower edge of the strap 21, thus pushing the cross-bar or flange 13 downwardly from the lower edge of said flange, which may be desirable when the leather is less wide than the length of that portion of the loop which is usually covered thereby. The flange 13' of the connecting-bar 13 being extended above the upper face of the arms 10 and 11 and abutting against the edge of the strap 21 serves to hold the loop against withdrawal and prevents the stitches being broken when strain is exerted on the loop. The upturned base 12 of the U-shaped loop facilitates the passage of a strap therethrough and enables the parts of the harness to be quickly and easily connected, which connection would be awkward and troublesome to effect were this end made in alinement with the arms 10 and 11, especially in cases where the harness member 20 extended beyond the end of the loop.

I claim as my invention—

A harness member such as a breast-strap, having a strap secured to the face thereof, in combination with a U-shaped member having its arms extended between said harness member and strap, said U-shaped member being curved upwardly at the base thereof which projects beyond the edge of the attaching-strap and provided with an integral cross-bar connecting the ends of the arms thereof and extended to form a flange abutting upon the opposite edge of the strap secured to the harness member, and a leather plug inserted between the arms of the U-shaped member and the harness member and strap, the latter being connected by unbroken rows of stitching extending through the plug between the arms of the U-shaped member.

In testimony that I claim the foregoing as my own I have hereto affixed my signature in the presence of two witnesses.

GEORGE F. FEHRING.

Witnesses:
 AL. DUCHOC,
 A. J. NOWOTNY.